(12) United States Patent
Yoshida

(10) Patent No.: US 9,286,838 B2
(45) Date of Patent: Mar. 15, 2016

(54) DISPLAY DEVICE, COMPUTER PROGRAM, RECORDING MEDIUM, AND METHOD FOR ESTIMATING TEMPERATURE

(75) Inventor: Yuya Yoshida, Ishikawa (JP)

(73) Assignee: EIZO Corporation, Ishikawa (JP)

( * ) Notice: Subject to any disclaimer, the term of this patent is extended or adjusted under 35 U.S.C. 154(b) by 0 days.

(21) Appl. No.: 14/358,489

(22) PCT Filed: Jun. 7, 2012

(86) PCT No.: PCT/JP2012/064627
§ 371 (c)(1),
(2), (4) Date: May 15, 2014

(87) PCT Pub. No.: WO2013/073221
PCT Pub. Date: May 23, 2013

(65) Prior Publication Data
US 2014/0354185 A1    Dec. 4, 2014

(30) Foreign Application Priority Data
Nov. 18, 2011    (JP) ................... 2011-253006

(51) Int. Cl.
*G05F 1/00*    (2006.01)
*G09G 3/36*    (2006.01)
(Continued)

(52) U.S. Cl.
CPC ...... *G09G 3/36* (2013.01); *G01K 7/427* (2013.01); *G01K 13/00* (2013.01); *G09G 2320/041* (2013.01)

(58) Field of Classification Search
CPC .................... H05B 33/02; H05B 33/08
USPC ........ 315/169.1, 169.3, 112, 117; 345/76–77, 345/81, 82, 84, 87, 104–105
See application file for complete search history.

(56) References Cited

U.S. PATENT DOCUMENTS 7,579,788 B2 *   8/2009   Huang .................... 315/291
2002/0122022 A1   9/2002   Tze
(Continued)

FOREIGN PATENT DOCUMENTS

CN    1376902 A    10/2002
EP    2 309 825 A1    4/2011
(Continued)

OTHER PUBLICATIONS

Australian Government Examination Report dated Aug. 1, 2014; 7 pgs.
(Continued)

*Primary Examiner* — Minh D A
(74) *Attorney, Agent, or Firm* — Maier & Maier, PLLC

(57) ABSTRACT

There are provided a display device which can accurately estimate an ambient temperature around the display device, a computer program, a recording medium, and a method for estimating an ambient temperature. A panel temperature sensor and a switch board temperature sensor are disposed in different positions of a display device. A control unit specifies correlation information indicating the correlation between a first temperature difference between a temperature detected by the panel temperature sensor and an ambient temperature and a second temperature difference between a temperature detected by the switch board temperature sensor and the ambient temperature. The control unit estimates the ambient temperature on the basis of the specified correlation information and the temperatures and detected by the panel temperature sensor and the switch board temperature sensor.

2 Claims, 9 Drawing Sheets

(51) Int. Cl.
*G01K 13/00* (2006.01)
*G01K 7/42* (2006.01)

(56) References Cited

U.S. PATENT DOCUMENTS

| | | |
|---|---|---|
| 2002/0135496 A1 | 9/2002 | Takehara |
| 2003/0152132 A1 | 8/2003 | Pipe et al. |
| 2004/0125853 A1 | 7/2004 | Yu |
| 2006/0071609 A1* | 4/2006 | Chou et al. ............ 315/112 |
| 2008/0136770 A1* | 6/2008 | Peker et al. ............ 345/102 |
| 2010/0118216 A1* | 5/2010 | Yano et al. ............ 348/836 |
| 2010/0277410 A1* | 11/2010 | You et al. ............ 345/102 |
| 2011/0205258 A1* | 8/2011 | Suminoe et al. ............ 345/690 |

FOREIGN PATENT DOCUMENTS

| | | |
|---|---|---|
| JP | 10-253946 A | 9/1998 |
| JP | 2004-125695 A | 4/2004 |
| JP | 2007-093939 A | 4/2007 |
| JP | 2010-101741 A | 5/2010 |
| JP | 2011-027644 A | 2/2011 |

OTHER PUBLICATIONS

International Search Report for PCT/JP2012/064627; mail date Aug. 28, 2012.

Extended European Search Report dated Mar. 19, 2015, including a Supplementary European Search Report and the European Search Opinion, in connection with EP Application No. 12849987.8.

Australian Office Action dated Mar. 24, 2015, in connection with AU Application No. 2012338158.

Russian Office Action dated Apr. 22, 2015, in connection with RU Application No. 2014120001/28(031909).

Chinese Office Action dated Jun. 30, 2015, in connection with corresponding CN Application No. 201280056495.9 (10 pgs.).

* cited by examiner

| Condition For Selecting Correlation | Selected Correlation | Features of Correlation |
|---|---|---|
| $\Delta Tp(t) - \Delta Ts(t) < \Delta Tth$ | $\Delta Ts(t) = A \times \{\Delta Tp(t) - \Delta Ts(t)\}$ | • Area where linear approximation is possible<br>• stage in which only heat generated by backlight is considered<br>• Temperatures detected by two temperature sensors rise at different rates |
| $\Delta Tp(t) - \Delta Ts(t) > \Delta Tth$ | $\Delta Ts(t) = B \times \{\Delta Tp(t) - \Delta Ts(t) - \Delta Tth\} + C \times \Delta Tth$ | • Thermal Equilibrium Area<br>• Stage in which not only temperature rise due to heat generated by backlight but also temperature rise due to convection are considered<br>• Temperatures detected by two temperature sensors rise at similar rates |

FIG. 5

When switch board temperature sensor is not directly influenced by heat generated by backlight.

DISPLAY DEVICE, COMPUTER PROGRAM, RECORDING MEDIUM, AND METHOD FOR ESTIMATING TEMPERATURE

TECHNICAL FIELD

The present invention relates to a display device which can estimate an ambient temperature around the display device, a computer program for estimating an ambient temperature around a display device, a recording medium having the computer program recorded thereon, and a method for estimating a temperature.

BACKGROUND ART

A display device including a display panel, such as a liquid crystal panel, displays the gradation of an image by changing light transmittance for each pixel of the liquid crystal panel and thus controlling the amount of light which is emitted from a backlight disposed on the back surface and transmitted through the panel. Since there are individual differences in gamma characteristics among liquid crystal panels, gradation characteristics specific to each display device are corrected in the manufacturing process to achieve a desired gradation characteristics.

However, the gamma characteristics of a display device vary depending on the display panel temperature. The display panel temperature is obtained by adding the ambient temperature to the temperature of the device itself whose circuit is generating heat. Accordingly, if the ambient temperature around a display device in actual use by a user is different from the ambient temperature around the display device in the manufacturing process, the gamma characteristics of the display device are also different between the two circumstances. Consequently, the desired gradation representation or hue may not be reproduced when the display device is actually used. Conventionally, gradation characteristics or the like have been temperature-compensated to maintain gradation representation or color reproducibility at any display panel temperature. However, exact measurement of the display panel temperature requires working on the display panel such as disposition of a temperature sensor inside the panel, resulting in a significant cost increase. For this reason, conventionally, gradation characteristics or the like have been temperature-compensated using a temperature which can be measured easily outside the display panel.

Disclosed as the related art is a display device including an outside air temperature detection unit configured to detect an outside air temperature outside the exterior unit of a liquid crystal display device, an internal temperature detection unit configured to detect an internal temperature inside the exterior unit, and a liquid crystal drive circuit configured to output a drive voltage corresponding to the difference between an outside air temperature and an internal temperature detected by the respective temperature detection units (see Patent Document 1).

PRIOR ART DOCUMENTS

Patent Documents

Patent Document 1: Japanese Unexamined Patent Application Publication No. 10-253946

SUMMARY OF THE INVENTION

Problems to be Solved by the Invention

While the device of Patent Document 1 has, outside the exterior unit, the temperature detection unit, which is supposed to detect an outside air temperature, the temperature detection unit has difficulty in accurately detecting an outside air temperature since it is actually influenced by heat generated inside the display device (e.g., heat generated by such as the backlight serving as a light source for the display panel). In terms of the design or use of the display device, it is unrealistic and actually impracticable to dispose a temperature detection unit such as a temperature sensor in a position which is not influenced by heat generated by the display device itself.

The present invention has been made in view of the foregoing, and an object thereof is to provide a display device which can accurately estimate an ambient temperature around the display device, a computer program for estimating an ambient temperature around a display device, a recording medium having the computer program recorded thereon, and a method for estimating a temperature.

Means for Solving the Problems

A first aspect of the present invention provides a display device having a display panel disposed in a casing and comprising:

two or more temperature sensors disposed in different positions;

specification means configured to specify correlation information indicating a correlation between temperatures detected by the temperature sensors; and estimation means connected to estimate an ambient temperature on the basis of the correlation information specified by the specification means and the temperatures detected by the temperature sensors.

In a second aspect of the present invention, the display device of the first aspect of present invention further comprises a backlight for the display panel, wherein the specification means specifies one of different pieces of correlation information on the basis of a comparison of the temperatures detected by the temperature sensors with a predetermined threshold temperature, and wherein the estimation means estimates the ambient temperature using the one piece of correlation information specified by the specification means.

In a third aspect of the present invention, the display device of the second aspect of the present invention further comprises setting means configured to set the amount of light of the backlight, wherein the specification means specifies correlation information using the predetermined threshold temperature corresponding to the amount of light set by the setting means.

A fourth aspect of the present invention provides a computer program for causing a computer to estimate an ambient temperature around a display device having a display panel disposed in a casing, the computer program causing the computer to perform the steps of:

specifying correlation information indicating a correlation between temperatures detected by two or more temperature sensors disposed in different positions of the display device; and estimating the ambient temperature on the basis of the specified correlation information and the temperatures detected by the temperature sensors.

A fifth aspect of the present invention provides a computer-readable recording medium, wherein the computer program of the fourth aspect of the present invention is recorded in the recording medium.

A sixth aspect of the present invention provides a method for estimating an ambient temperature around a display device having a display panel disposed in a casing, comprising:

specifying correlation information indicating a correlation between temperatures detected by two or more temperature sensors disposed in different positions of the display device; and estimating the ambient temperature on the basis of the specified correlation information and the temperatures detected by the temperature sensors.

In the first, fourth, fifth, and sixth aspects of the present invention, two or more temperature sensors are disposed in different positions of the display device. The temperature sensors may be disposed adjacent to the display panel or disposed in positions remote therefrom. Preferably, the temperature sensors are disposed in positions whose temperatures change in a different manner until reaching thermal equilibrium. The expression "temperatures change in a different manner until reaching thermal equilibrium" means, for example, that the temperatures rise in a different manner in the same period of time. In this case, at least two temperature sensors are required.

The specification means specifies correlation information indicating the correlation between the temperatures detected by the temperature sensors. The method for specifying correlation information may be, for example, to previously store correlation information in storage means or to calculate correlation information using a formula representing a correlation. In the following description, it is assumed that the display device is provided with two temperature sensors, first and second temperature sensors; the difference between a temperature Tp detected by the first temperature sensor and an ambient temperature Te is defined as a first temperature difference $\Delta Tp$; and the difference between a temperature Ts detected by the second temperature sensor and the ambient temperature Te is defined as a second temperature difference $\Delta Ts$. The term "correlation" refers to the temporal relation between the first temperature difference $\Delta Tp$ and the second temperature difference $\Delta Ts$ and is represented by a relational expression between the second temperature difference $\Delta Ts$ and $(\Delta Tp - \Delta Ts)$. The second temperature difference $\Delta Ts$ is the difference between the temperature Ts and the ambient temperature Te, and $(\Delta Tp - \Delta Ts)$ is the difference between the temperature Tp and the temperature Ts. As used herein, the ambient temperature is the ambient temperature around the display device, that is, a temperature which is not influenced by such as temperature rises caused by heat generated by the display device. Accordingly, when the display device is indoors, the ambient temperature is approximately equal to the indoor temperature; when the display device is outdoors, it is approximately equal to the outdoor temperature.

The estimation means estimates the ambient temperature Te on the basis of the specified correlation information and the temperatures detected by the temperature sensors. For example, if the temperatures Tp and Ts can be detected, $(\Delta Tp - \Delta Ts)$ can be obtained. Then the ambient temperature Te can be estimated using the correlation between $(\Delta Tp - \Delta Ts)$ and the temperature difference $\Delta Ts$, which is the difference between the temperature Ts and the ambient temperature Te. Thus, it is possible to accurately estimate the ambient temperature, which influences characteristics (gamma characteristics) of the display panel. Further, since the correlation is the correlation between time-varying temperature rises with respect to the ambient temperature, it is possible to accurately estimate the ambient temperature, not only when the display device is placed in a thermally stable state, but also, for example, when the display device, having no heat generated by the circuit thereof or convective heat, is placed in a thermally transition state for a certain time immediately after the display device is powered on. Furthermore, there is no need to dispose temperature sensors in positions which are not influenced by heat generated by the display device.

In the second aspect of the present invention, the display device further includes a backlight for the display panel, and the two or more temperature sensors are disposed in different positions. For example, the temperature sensors are disposed in different positions adjacent to the backlight. In this case, the temperature sensors may be in contact with the backlight or separate therefrom, as long as the temperature sensors are disposed within a range where they are influenced by heat (conductive heat or radiant heat) generated by the backlight. The temperature (the temperature which influences characteristics of the display panel) inside the casing housing the display panel is derived from the ambient temperature, heat (e.g., conductive heat or radiant heat) generated by the backlight acting as a main heat-generating component, and the convection in the casing. When the display device starts to operate (for example, immediately after the display device is powered on), the convection in the casing is very small and the influence of heat generated by the backlight is very small as well. Accordingly, the temperatures Tp and Ts detected by the first and second temperature sensors can be regarded as being the same.

Subsequently, heat generated by the backlight raises the temperatures Tp and Ts detected by the first and second temperature sensors. Since the first and second temperature sensors are disposed in different positions adjacent to the backlight, the temperature rises (Tp–Te) (Ts–Te) become different from each other with time, that is, the first temperature difference $\Delta Tp$ and the second temperature difference $\Delta Ts$ increase at different rates with time. Specifically, in a certain period immediately after the display device having no heat generated by the circuit thereof or convective heat is powered on, the first temperature difference $\Delta Tp$ and the second temperature difference $\Delta Ts$ increase at different rates with time. During this period, the temperatures are significantly influenced by conductive heat or radiant heat from the backlight, but influenced by the convection in the casing to only a negligible extent. This state is a so-called transition state (may also be referred to as a first stage).

After the first temperature difference $\Delta Tp$ and the second temperature difference $\Delta Ts$ increase to some extent, the display device is placed in a thermally stable state derived from not only conductive heat or radiant heat from the backlight but also the convection in the casing, that is, placed in so-called thermal equilibrium (may be referred to as a second stage). The correlation between the first temperature difference $\Delta Tp$ and the second temperature difference $\Delta Ts$ in this thermal equilibrium state differs from that in the first stage. That is, since the temperature in the casing is stabilized, the first temperature difference $\Delta Tp$ and the second temperature difference $\Delta Ts$ increase at similar rates with time.

The specification means specifies one of different pieces of correlation information. For example, when the difference temperature $(\Delta Tp - \Delta Ts)$ between the first temperature difference $\Delta Tp$ and the second temperature difference $\Delta Ts$ is smaller than a predetermined threshold temperature $\Delta Tth$, the specification means specifies correlation information where the first temperature difference $\Delta Tp$ and the second temperature difference $\Delta Ts$ increase at different rates with time; when the difference temperature $(\Delta Tp - \Delta Ts)$ is greater than the predetermined threshold temperature $\Delta Tth$, it specifies correlation information where the first temperature difference ΔTp and the second temperature difference ΔTs increase at similar rates with time. The predetermined threshold temperature ΔTth refers to the temperature at which the second stage (thermal equilibrium) starts. The estimation means estimates the ambient temperature using the specified correlation information. For example, the estimation means estimates the ambient temperature on the basis of the correlation information specified according to whether the difference temperature (ΔTp−ΔTs) is greater or smaller than the threshold temperature ΔTth.

Thus, the ambient temperature can be accurately estimated, for example, even when the display device having no heat generated by the circuit thereof or convective heat is placed in a thermally transition state for a certain time immediately after the display device is powered on, or even when the display device is placed in a thermally stable state (thermal equilibrium).

In the third aspect of the present invention, the display device further includes the setting means configured to set the amount of light of the backlight. The setting means is, for example, an operation panel, operation switch, or the like for setting the amount of light. By setting the amount of light, it is possible to change a drive signal outputted to the backlight to change the amount of drive of the backlight. Thus, it is possible to adjust light emitted from the backlight, that is, the luminance of the display panel. Examples of the drive signal of the backlight include a pulse signal and a DC signal. For the former, a change to the duty ratio of a pulse (PWM value) corresponds to a change to the amount of drive; for the latter, a change to DC level corresponds to a change to the amount of drive.

The specification means specifies a threshold temperature corresponding to the set amount of light and correlation information corresponding to the threshold temperature. For example, there may be used a calculation circuit for obtaining a threshold temperature ΔTth corresponding to the set amount of light and obtaining the correlation between the first temperature difference ΔTp and the second temperature difference ΔTs corresponding to the threshold temperature ΔTth. There may be previously stored multiple different threshold temperatures ΔTth corresponding to the amounts of light of the backlight as well as multiple different pieces of correlation information between the first temperature difference ΔTp and the second temperature difference ΔTs corresponding to threshold temperatures. The threshold temperature ΔTth is the temperature at which the second stage starts, and depends on the amount of heat generated by the backlight. The amount of heat generated by the backlight corresponds to the amount of drive of the backlight, for example, the duty ratio (PWM value) of a drive signal outputted to the backlight. For this reason, multiple different threshold temperatures ΔTth corresponding to the amounts of light of the backlight are predetermined, and different pieces of correlation information between the first temperature difference ΔTp and the second temperature difference ΔTs corresponding to the threshold temperatures ΔTth are predetermined.

The estimation means estimates the ambient temperature using the correlation information corresponding to the set amount of light. Specifically, the estimation means determines a threshold temperature ΔTth corresponding to the set amount of light, determines correlation information corresponding to the determined threshold temperature ΔTth, and estimates the ambient temperature using the determined correlation information. Thus, even when the amount of light of the backlight is changed, the estimation means can accurately estimate the ambient temperature.

Effect of the Invention

According to the present invention, not only when the display device is placed in a thermally stable state, but also, for example, when it is placed in a thermally transition state after powered on, the ambient temperature can be accurately estimated.

BRIEF DESCRIPTION OF THE DRAWINGS

FIG. 5 is a diagram showing examples of the correlation between display device-derived temperatures of the present embodiment.

EMBODIMENTS

Figure 1:
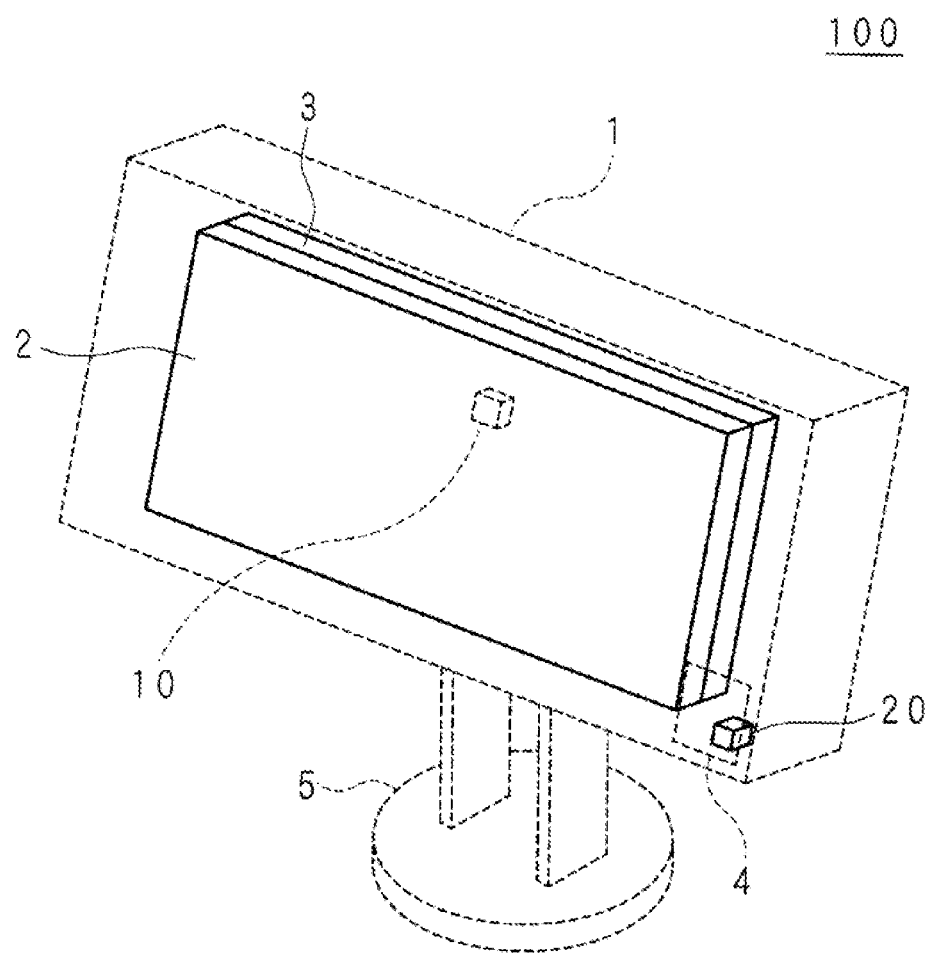
FIG. 1 is a perspective view showing the appearance of a main part of a display device of the present embodiment.
Figure 2:
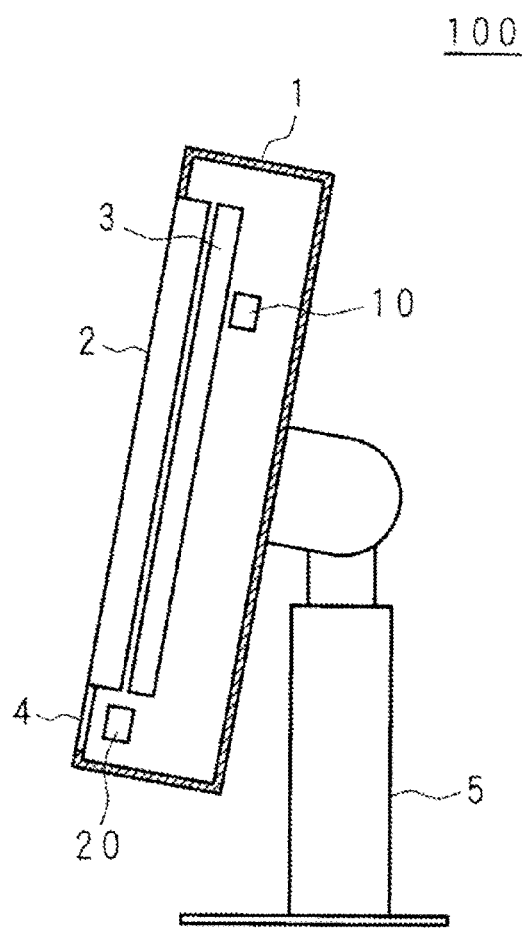
FIG. 2 is a side view showing the appearance of the main part of the display device of the present embodiment.

Now, a display device, a computer program, a recording medium, and a method for estimating a temperature of the present invention will be described with reference to the drawings showing an embodiment. FIG. 1 is a perspective view showing the appearance of a main part of a display device 100 of the present embodiment. FIG. 2 is a side view showing the appearance of the main part of the display device 100 of the present embodiment.

In the display device 100, a synthetic-resin or metal casing 1 houses a display panel 2, a backlight 3, a circuit substrate (not shown), and the like. The backlight 3 is disposed on the back of the display panel 2 and includes, for example, a light source such as a cold cathode fluorescent lamp (CCFL) or light-emitting diode (LED), an optical member configured to apply light from the light source to the back of the display panel 2 by reflecting or diffusing the light, and the like. The casing 1 has, on the front thereof, an operation switch 4 to which a switch board (not shown) is connected. Fixed to the back of the casing 1 is a stand 5. The stand 5 supports the back of the casing 1 in such a manner that the display surface is inclined at approximately a right angle or a desired angle to the desktop, floor, or the like.

Disposed adjacent to the display panel 2 is a panel temperature sensor 10 serving as a first temperature sensor. Since the panel temperature sensor 10 is disposed adjacent to the panel, the temperature detected thereby is not the temperature of the display panel itself but the temperature where the ambient temperature is added to the display device-derived temperature. A switch board temperature sensor 20 serving as a second temperature sensor is disposed on the switch board, which is connected to the operation switch 4. That is, since the switch board temperature sensor 20 is disposed in a position different from the panel temperature sensor 10, the temperature detected thereby changes in a manner different from that in which the temperature detected by the panel temperature sensor 10 changes, until reaching thermal equilibrium.

The expression "adjacent to the display panel 2" refers to within a range which is not remote from the display panel 2 so that a temperature which is as close as possible to the temperature of the display panel 2 (e.g., the internal temperature of the display panel 2) can be detected. In this case, the panel temperature sensor 10 may be in contact with or separate from the display panel 2, as long as the panel temperature sensor 10 is disposed within a range where it is influenced by heat (conductive heat or radiant heat) generated by the display panel 2. Note that the switch board temperature sensor 20 may be disposed adjacent to the display panel 2 or disposed in a position remote from the display panel 2. The expression "the temperatures change in a different manner until reaching thermal equilibrium" means, for example, that the temperatures rise at different rates in the same period. Two or more temperature sensors may be disposed.

More specifically, in the examples of FIGS. 1 and 2, the panel temperature sensor 10 and the switch board temperature sensor 20 are disposed in different positions adjacent to the backlight 3. These temperature sensors may be in contact with or separate from the backlight 3, as long as the temperature sensors are disposed in a range where they are influenced by heat (conductive heat or radiant heat) generated by the backlight 3. In FIGS. 1 and 2, the temperature sensors are disposed inside the casing. However, the temperature sensors may be disposed outside the casing, as long as they are disposed in a range where they are influenced by heat generated by the display panel 2.

Figure 3:
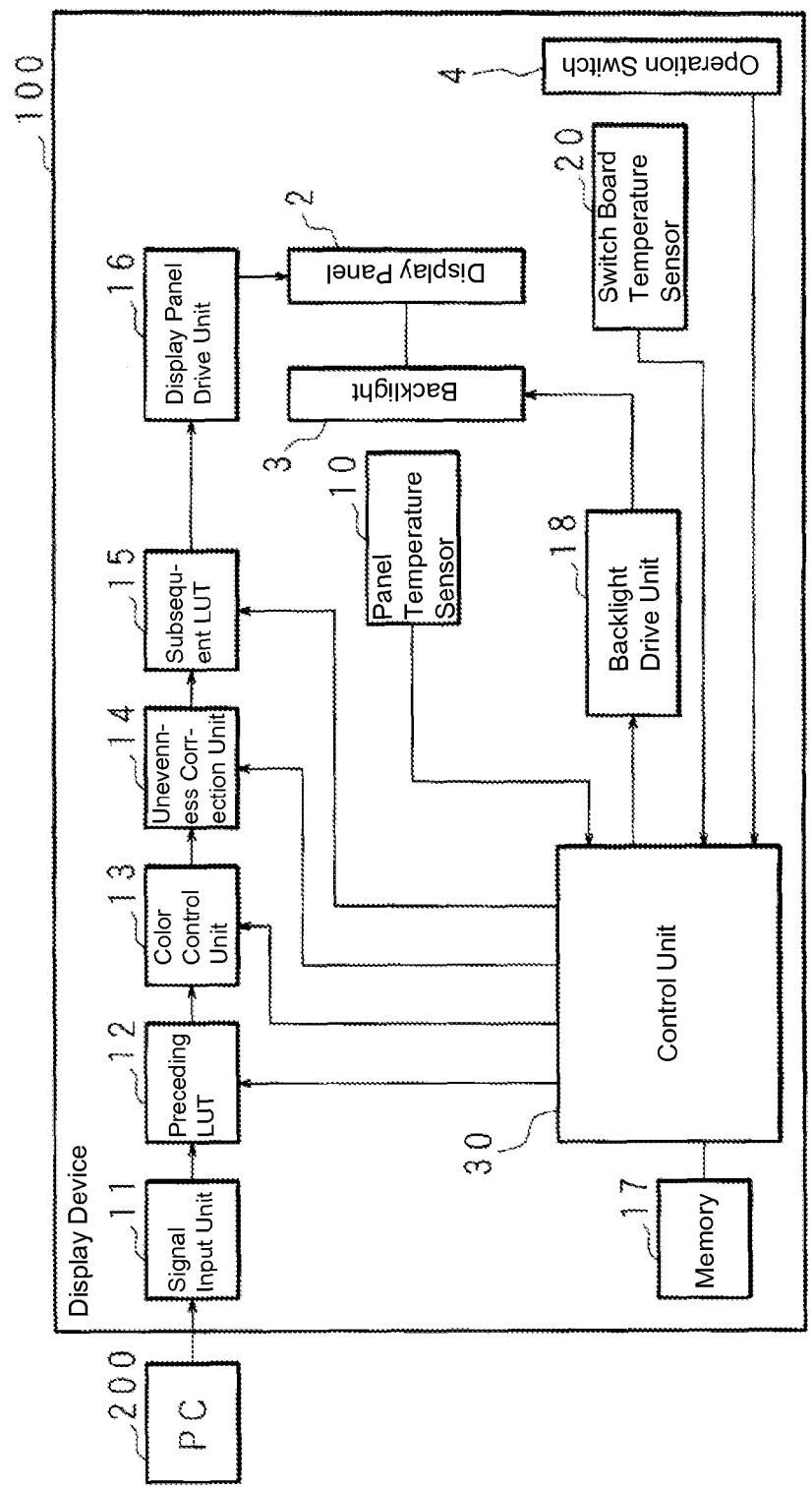
FIG. 3 is a block diagram showing an example configuration of the display device of the present embodiment.

FIG. 3 is a block diagram showing an example configuration of the display device 100 of the present embodiment. The display device 100 includes a control unit 30, a memory 17, a signal input unit 11, a preceding lookup table (LUT) 12, a color control unit 13, an unevenness correction unit 14, a subsequent lookup table (LUT) 15, a display panel drive unit 16, the backlight 3, a backlight drive unit 18, the display panel 2, the operation switch 4, the panel temperature sensor 10 serving as the first temperature sensor, the switch board temperature sensor 20 serving as the second temperature sensor, and the like. The display device 100 is connected to an external personal computer (PC) 200 through a signal line.

The signal input unit 11 has a connection terminal which is connected to an external device such as the PC 200 through a cable. The signal input unit 11 receives a video signal from the PC 200 and outputs the received video signal to the preceding LUT 12. The video signal that the signal input unit 11 receives from the PC 200 may be an analog signal or digital signal. While color video signals are used in the embodiment below, monochrome video signals may be used. In this case, a component for color video signals, such as the color control unit, becomes unnecessary.

The preceding LUT 12 includes, for example, LUTs corresponding to R (red), G (green), and B (blue). In each LUT, input gradation levels indicated by received video signals and levels (output values) corresponding to the input gradation levels and to be inputted to the display panel 2 (more specifically, subsequent LUT 15) are associated with each other. In the preceding LUT 12, each input gradation level is represented by, e.g., 8 bits, and output gradation levels (output values) each represented by, e.g., 14 bits are stored in 256 entries corresponding to 256 gradation levels of 0 to 255. The preceding LUT 12 is configured so that the user can set gradation characteristics (e.g., the user can set a gamma value). Thus, the user can achieve a desired gradation characteristics.

Under the control of the control unit 30, the color control unit 13 color-adjusts (color-controls) an output value (output gradation level) outputted from the preceding LUT 12, for example, by intensifying or weakening particular color components using a 3×3 matrix (color conversion matrix D) consisting of conversion coefficients corresponding to R, G, and B components.

Under the control of the control unit 30, the unevenness correction unit 14 corrects unevenness of on an output gradation level (output value) outputted from the color control unit 13 and outputs the corrected output gradation level (output value) to the subsequent LUT 15.

The subsequent LUT 15 functions as gradation-level correction means and includes, for example, LUTs corresponding to R (red) G (green), and B (blue). The subsequent LUT 15 corrects the output gradation level to represent smooth gradation on the display panel 2 so that different gradation characteristics exhibit an ideal gamma value (subsequent gamma; e.g., 2.2), and then outputs the corrected output gradation level (corrected signal) to the display panel drive unit 16.

The display panel drive unit 16 includes a gate driver, a source driver, and the like and drives the display panel 2 on the basis of the correction signal received from the subsequent LUT 15 under the control of the control unit 30.

The display panel 2 is, for example, a liquid crystal panel where a pair of glass substrates are disposed as opposed to each other; a liquid crystal layer including a liquid crystal material is formed in the gap therebetween; one of the glass substrates is provided with multiple pixel electrodes and TFTs having drains connected to the pixel electrodes; and the other glass substrate is provided with a common electrode. The gates and sources of the TFTs are connected to the output terminals of a gate driver and those of a source driver, respectively.

The display panel 2 on-off controls the TFT of each pixel using a gate signal received from the gate driver. It also controls optical transmittance, which is determined by electro-optic characteristics of the liquid crystal material, and displays an image in gradation by applying an output voltage (a level inputted to the display panel 2) received from the source driver to the TFT of each pixel during the ON period. The display panel 2 is sandwiched between a pair of polarizing plates and has the backlight 3 disposed on the back thereof.

Assuming that the backlight 3 is of pulse-driven type, the backlight drive unit 18 outputs a drive signal having a desired duty ratio (PWM value) to the backlight under the control of the control unit 30 3 to change the amount of drive of the backlight 3. Thus, it is possible to adjust light emitted from the backlight 3, that is, the luminance of the display panel 2. The backlight 3 need not necessarily be of pulse-driven type and may be of a drive type such as DC-driven type. In this case, the backlight drive unit 18 changes the DC level to a desired level to adjust luminance.

The operation switch 4 functions as setting means for setting the adjustment values of the display device 100, including the amount of light. By setting the amount of light of the backlight 3 using the operation switch 4, the user can change the duty ratio (PWM value) of a drive signal outputted to the backlight 3 by the backlight drive unit 18 so as to change the amount of drive of the backlight 3. Thus, the user can adjust light emitted from the backlight 3, that is, the luminance of the display panel. Note that an operation panel or the like may be used in place of the operation switch.

The control unit 30 functions as specification means for specifying correlation information indicating the correlation between a first temperature difference $\Delta Tp$ serving as the difference between a temperature Tp detected by the panel temperature sensor (first temperature sensor) 10 and an ambient temperature Te and a second temperature difference $\Delta Ts$ serving as the difference between a temperature Ts detected by the switch board temperature sensor (second temperature sensor) 20 and the ambient temperature Te.

Correlation information may be specified by previously storing pieces of correlation information in the memory 17, or the control unit 30 may calculate correlation information using a formula representing a correlation. The term "correlation" refers to the temporal relation between the first temperature difference $\Delta Tp$ and the second temperature difference $\Delta Ts$ and is represented, for example, by a relational expression between the second temperature difference $\Delta Ts$ and ($\Delta Tp - \Delta Ts$). The second temperature difference $\Delta Ts$ is the difference between the temperature Ts and the ambient temperature Te, and ($\Delta Tp - \Delta Ts$) is the difference between the temperature Tp and the temperature Ts. As used herein, the ambient temperature is the ambient temperature around the display device 100 and is a temperature which is not influenced (e.g., not raised) by heat generated by the display device 100.

Figure 4:
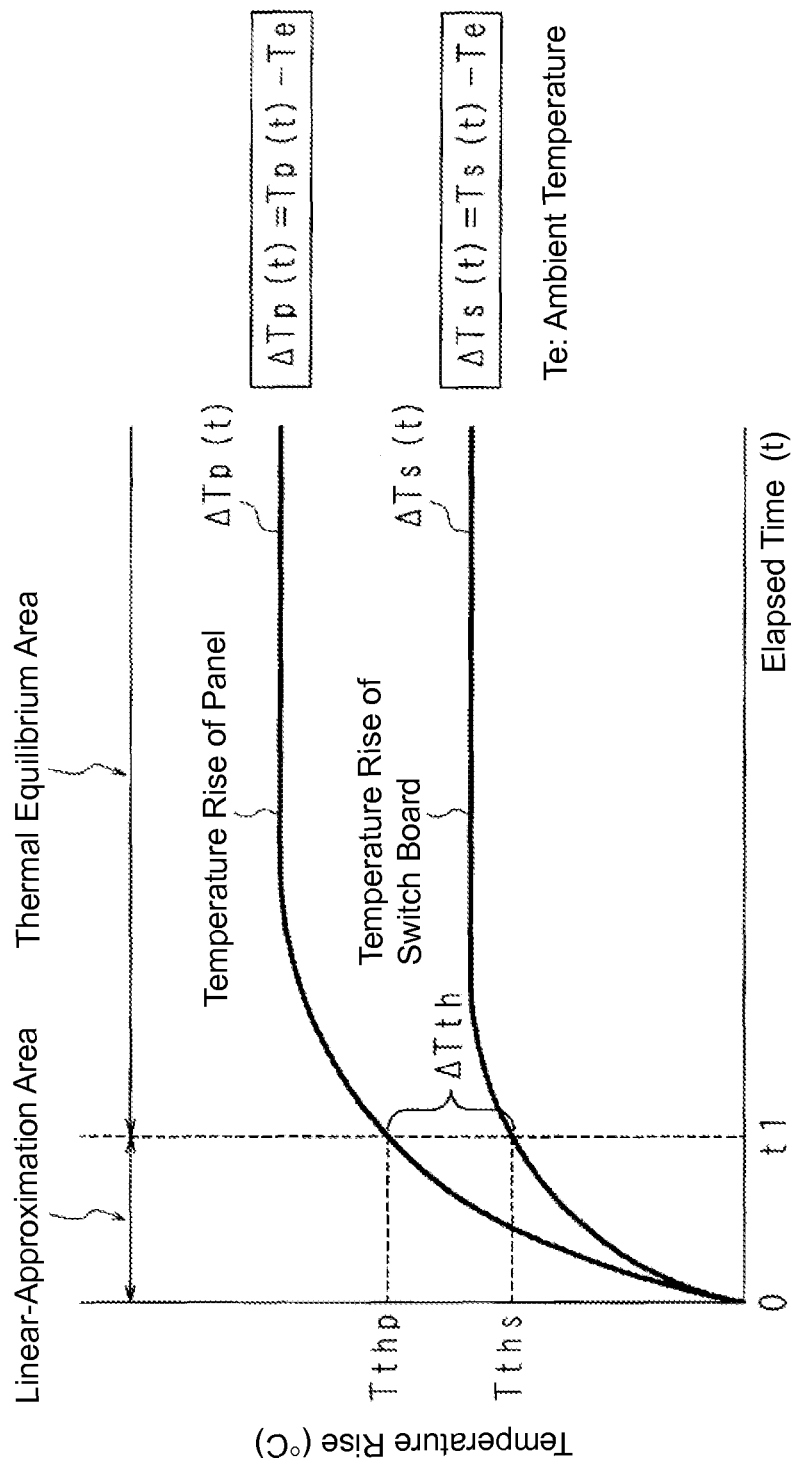
FIG. 4 is a graph showing an example of temperature changes in the display device of the present embodiment.

FIG. 4 is a graph showing an example of temperature changes in the display device 100 of the present embodiment. More specifically, FIG. 4 shows temporal changes (temperature rises) in the first temperature difference $\Delta Tp(t)$ and the second temperature difference $\Delta Tp(t)$. The horizontal axis represents elapsed time, and the vertical axis represents a temperature rise. As described above, the first temperature difference $\Delta Tp(t)$ is a temperature obtained by subtracting the ambient temperature Te from the temperature Tp(t) detected by the panel temperature sensor 10 and represents the temperature rise of the panel. Similarly, the second temperature difference $\Delta Tp(t)$ is a temperature obtained by subtracting the ambient temperature Te from the temperature Ts(t) detected by the switch board temperature sensor 20 and represents the temperature rise of the switch substrate. In the following description, Tp(t), Ts(t), $\Delta Tp(t)$, and $\Delta Tp(t)$ are expressed as Tp, Ts, $\Delta Tp$, and $\Delta Ts$, respectively, for the sake of simplification.

The temperature (the temperature which influences characteristics of the display panel 2) inside the casing 1 housing the display panel 2 is derived from the ambient temperature Te, heat (e.g., conductive heat or radiant heat) generated by the backlight 3 acting as a main heat-generating component, and the convection in the casing 1. When the display device includes a power supply circuit (not shown), the power supply circuit also acts as a main heat-generating component. Immediately after the display device 100 having no such heat or convective heat in the casing 1 and thus being cooled is powered on, the display device 100 is influenced by heat generated by the backlight 3 to only a very small extent, and the convection in the casing 1 associated with such heat is also very small. For this reason, the temperatures Tp and Ts detected by the panel temperature sensor 10 and the switch board temperature sensor 20 can be regarded as being the same. That is, the first temperature difference $\Delta Tp$ and the second temperature difference $\Delta Ts$ can be regarded as being the same.

Subsequently, heat generated by the backlight 3 raises the temperatures Tp and Ts detected by the panel temperature sensor 10 and the switch board temperature sensor 20. Since the panel temperature sensor 10 and the switch board temperature sensor 20 are disposed in different positions adjacent to the backlight 3, the temperature rises (Tp−Te) and (Ts−Te) occur in a different manner with time, in other words, the first temperature difference $\Delta Tp$ and the second temperature difference $\Delta Ts$ increase at different rates with time. The temporal increases in the first temperature difference $\Delta Tp$ and the second temperature difference $\Delta Ts$ can approximate lines having different slopes. That is, in the period immediately after the power is turned on, the first temperature difference $\Delta Tp$ and the second temperature difference $\Delta Ts$ increase at different rates with time. In this period, the display device is significantly influenced by conductive heat or radiant heat from the backlight 3. This period is a so-called transition state period (may also be referred to as a first stage or a linear-approximation area).

After the first temperature difference $\Delta Tp$ and the second temperature difference $\Delta Ts$ have increased to some extent (after time t1 in FIG. 4), the display device is influenced by not only conductive heat or radiant heat from the backlight 3 but also the convection in the casing 1 and thus placed in a thermally stable state, that is, so-called thermal equilibrium (may also be referred to as a second stage). In this thermal equilibrium state, the correlation between the first temperature difference $\Delta Tp$ and the second temperature difference $\Delta Ts$ differs from that in the first stage, and the temperature in the casing is stabilized. For this reason, the first temperature difference $\Delta Tp$ and the second temperature difference $\Delta Ts$ can be determined to increase at similar rates with time.

Hereafter, the sum of the temperature derived from conductive heat or radiant heat from the backlight 3 and the temperature derived from the convection in the casing will be referred to as the display device-derived temperature. The present invention takes note of the fact that there is a correlation between the display device-derived temperature included in the temperature detected by the panel temperature sensor 10 and the display device-derived temperature included in the temperature detected by the switch board temperature sensor 20. This correlation will be described in detail below. Note that the correlation described below is a correlation when the panel temperature sensor 10 and the switch board temperature sensor 20 are disposed adjacent to the backlight 3 and influenced by conductive heat or radiant heat from the backlight 3.

$$\Delta Tp(t) = a \times t \tag{1}$$

$$\Delta Ts(t) = b \times t \tag{2}$$

$$\Delta Tp(t) - \Delta Ts(t) = (a - b) \times t \tag{3}$$

$$\Delta Ts(t) = A \times \{\Delta Tp(t) - \Delta Ts(t)\} \tag{4}$$

$$A = \frac{b}{a - b} \tag{5}$$

As shown in FIG. 4, in the linear-approximation area, the first temperature difference $\Delta Tp$ can approximate a line, as shown in Formula (1), and the second temperature difference $\Delta Ts$ can approximate a line, as shown in Formula (2). In these formulas, a and b each represent a slope when linear approximation is obtained. Subtraction of both sides of Formula (2) from both sides of Formula (1) gives Formula (3). Accordingly, $\Delta Ts(t)$ can be represented as in Formula (4). A coefficient A can be represented by Formula (5). That is, in the linear-approximation area (first stage, transition state), there is a correlation represented by Formula (4) between the first temperature difference ΔTp(t) and the second temperature difference ΔTs(t) and more specifically between the second temperature difference ΔTs(t) and {ΔTp(t)−ΔTs(t)}.

As shown in FIG. 4, the temperature rise of the panel on the boundary between the linear-approximation area and the thermal equilibrium area is defined as Tthp, and the temperature rise of the switch substrate on that boundary is defined as Tths. In the thermal equilibrium area, the ratio of the temperature rise to the elapsed time is small. Accordingly, the time constant τp of temperature change of the panel temperature sensor 10 and the time constant τs of temperature change of the switch board temperature sensor 20 can be regarded as the same value τ. That is, in the thermal equilibrium area, the first temperature difference ΔTp and the second temperature difference ΔTs can be determined to increase at similar rates with time.

$$\Delta Tp(t) = (T\max p - Tthp) \times \left(1 - e^{-\frac{t}{\tau}}\right) + Tthp \quad (6)$$

$$\Delta Ts(t) = (T\max s - Tths) \times \left(1 - e^{-\frac{t}{\tau}}\right) + Tths \quad (7)$$

$$\Delta Tp(t) - \Delta Ts(t) = \quad (8)$$
$$\{(T\max p - T\max s) - (Tthp - Tths)\} \times \left(1 - e^{-\frac{t}{\tau}}\right) + (Tthp - Tths)$$

$$\left(1 - e^{-\frac{t}{\tau}}\right) = \frac{\Delta Ts(t) - Tths}{T\max - Tths} \quad (9)$$

$$\Delta Tp(t) - \Delta Ts(t) = (\Delta T\max - \Delta Tth) \times \frac{\Delta Ts(t) - Tths}{T\max - Tths} + \Delta Tth \quad (10)$$

$$\Delta T\max = T\max p - T\max s \quad (11)$$

$$\Delta Tth = Tthp - Tths \quad (12)$$

$$\Delta Ts(t) = B \times (\Delta Tp(t) - \Delta Ts(t) - \Delta Tth) + C \times \Delta Tth \quad (13)$$

$$B = \frac{T\max s - Tths}{\Delta T\max - \Delta Tth} \quad (14)$$

$$C = \frac{Tths}{Tthp - Tths} \quad (15)$$

Accordingly, in the thermal equilibrium area shown in FIG. 4, the first temperature difference ΔTp(t), which is the temperature rise of the panel, can be represented by Formula (6); the second temperature difference ΔTp(t), which is the temperature rise of the switch substrate, can be represented by Formula (7). In Formula (6), Tmaxp represents the maximum value (highest value) of the temperature rise of the panel and can have a value such as 3° C., 4° C., or 5° C. Note that the maximum value (highest value) of the temperature rise of the panel can vary depending on the mounting position of the panel temperature sensor 10. In Formula (7), Tmaxs represents the maximum value (highest value) of the temperature rise of the switch substrate and depends on the mounting position of the switch board temperature sensor 20. Subtraction of both sides of Formula (7) from both sides of Formula (6) gives Formula (8). Formula (9) can be obtained from Formula (7), and Formula (10) can be obtained by substituting Formula (9) into Formula (8). ΔTmax can be represented by Formula (11), and ΔTth can be represented by Formula (12). Formula (13) can be obtained from Formula (10). Coefficients B and C can be represented by Formulas (14) and (15), respectively. That is, in the thermal equilibrium area (second stage, stable state), there is a correlation represented by Formula (13) between the first temperature difference ΔTp(t) and the second temperature difference ΔTs(t) and more specifically between the second temperature difference ΔTs(t) and {ΔTp(t)−ΔTs(t)}.

FIG. 5 is a diagram showing examples of the correlation between temperatures derived from the display device 100 of the present embodiment. As shown in FIG. 5, when the difference (ΔTp−ΔTs) between the first temperature difference ΔTp(t), which is the temperature rise of the panel, and the second temperature difference ΔTp(t), which is the temperature rise of the switch substrate, is smaller than the predetermined threshold temperature ΔTth, a correlation where the first temperature difference ΔTp and the second temperature difference ΔTs increase at different rates with time, as shown in FIG. 4 and Formulas (1) and (2), is selected, that is, ΔTs(t)=A×{ΔTp(t)−ΔTs(t)} is selected. Features of this correlation include, for example, the following: this correlation can be used in the area where the temperature rise can approximate a line; this correlation represents the stage in which only heat generated by the backlight 3 is considered; and the temperatures detected by the panel temperature sensor 10 and the switch board temperature sensor 20 increase at different rates. The predetermined threshold temperature ΔTth represents the temperature at which the second stage (thermal equilibrium) starts. The predetermined threshold temperature ΔTth may have a value such as 1.5° C., 2° C., or 2.5° C.

On the other hand, when the difference (ΔTp−ΔTs) between the first temperature difference ΔTp(t), which is the temperature rise of the panel, and the second temperature difference ΔTs(t), which is the temperature rise of the switch substrate, is greater than the predetermined threshold temperature ΔTth, a relation where the first temperature difference ΔTp and the second temperature difference ΔTs increase at similar rates with time, as shown in FIG. 4 and Formulas (6) and (7), is selected, that is, ΔTs(t)=B×{ΔTp(t)−ΔTs(t)−ΔTth}+C×ΔTth is selected. Features of this correlation include, for example, the following: this correlation can be used in the thermal equilibrium area; this correlation represents the stage where not only heat generated by the backlight 3 but also the convection in the casing 1 should be considered; and the temperatures detected by the panel temperature sensor 10 and the switch board temperature sensor 20 rise at similar rates.

The control unit 30 functions as means for estimating the ambient temperature. The control unit 30 estimates the ambient temperature Te on the basis of the specified correlation information and the temperatures Tp and Ts detected by the first and second temperature sensors.

When the difference temperature (ΔTp−ΔTs) between the first temperature difference ΔTp and the second temperature difference ΔTs is smaller than the predetermined threshold temperature ΔTth, the control unit 30 estimates the ambient temperature using the correlation (correlation information) where the first temperature difference ΔTp and the second temperature difference ΔTs increase at different rates with time; when the difference temperature (ΔTp−ΔTs) between the first temperature difference ΔTp and the second temperature difference ΔTs is greater than the predetermined threshold temperature ΔTth, the control unit 30 estimates the ambient temperature using the correlation (correlation information) where the first temperature difference ΔTp and the second temperature difference ΔTs increase at similar rates with time. The predetermined threshold temperature ΔTth represents the temperature at which the second stage (thermal equilibrium) starts.

Figure 6:
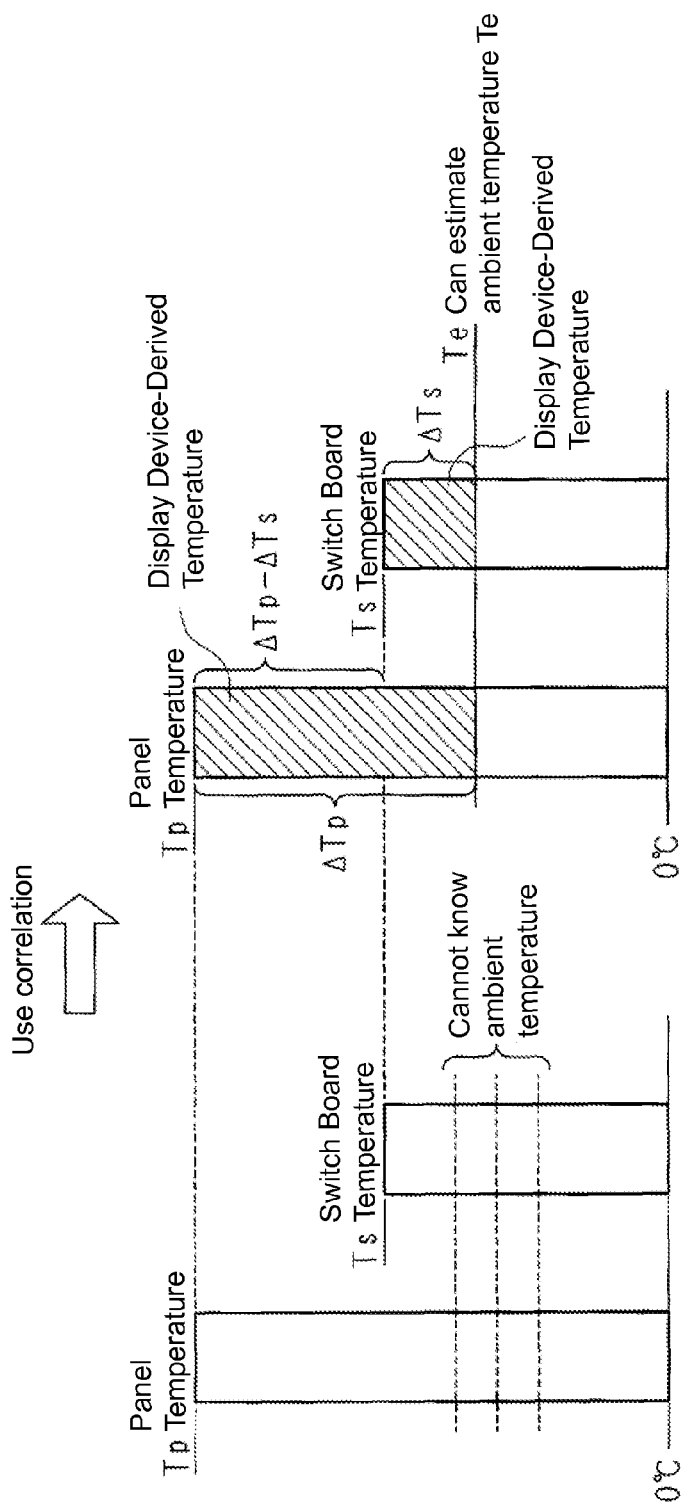
FIG. 6 is a conceptual diagram showing an example where the ambient temperature is estimated based on a correlation.

FIG. 6 is a conceptual diagram showing an example where the ambient temperature is estimated based on a correlation.

In FIG. 6, bar charts show the panel temperature Tp and the switch substrate temperature Ts, respectively, and show values from the temperature 0° C. Although the term "the panel temperature Tp" is used herein for the sake of convenience, the panel temperature Tp is not the temperature of the panel itself and is, to be precise, the sum of the display device-derived temperature and the ambient temperature. As shown in FIG. 6, it is not possible to know the ambient temperature Te by simply detecting the panel temperature Tp and the switch substrate temperature Ts.

However, the ambient temperature Te can be obtained from the panel temperature Tp and the switch substrate temperature Ts by using the correlation between the display device 100-derived temperature (the sum of the temperature derived from heat generated by the backlight 3 and the temperature derived from the convection in the casing 1) included in the first temperature difference $\Delta$Tp, which is the temperature rise of the panel, and the display device 100-derived temperature included in the second temperature difference $\Delta$Ts, which is the temperature rise of the switching substrate.

That is, if the panel temperature Tp and the switch substrate temperature Ts can be detected, ($\Delta$Tp−$\Delta$Ts) can be obtained, and the ambient temperature Te can be estimated using the correlation between ($\Delta$Tp−$\Delta$Ts) and the temperature difference $\Delta$Ts between the temperature Ts and the ambient temperature Te.

Figure 7:
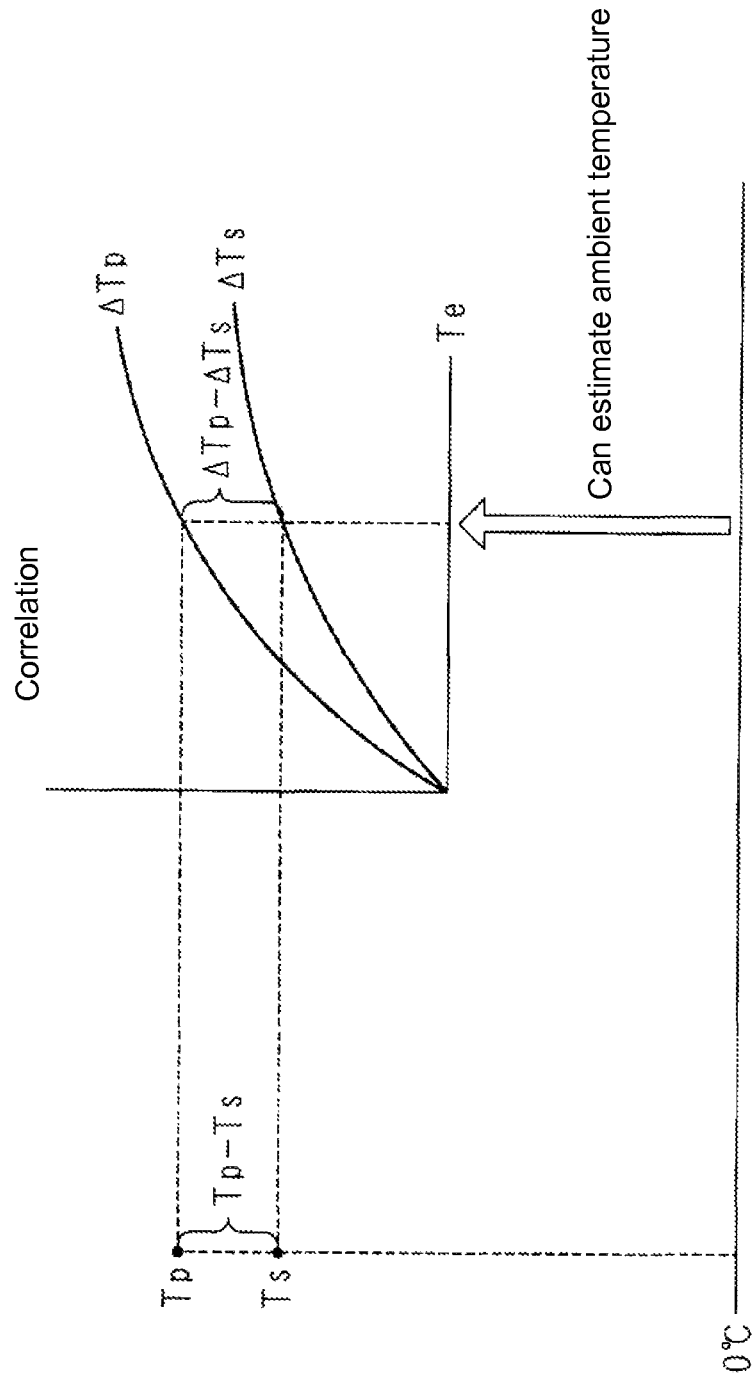
FIG. 7 is a conceptual diagram showing another example where the ambient temperature is estimated based on a correlation.

FIG. 7 is a conceptual diagram showing another example where the ambient temperature is estimated based on a correlation. FIG. 7 is essentially the same as FIG. 6 but is represented in a different form. As shown in FIG. 7, if the panel temperature Tp and the switch substrate temperature Ts can be detected, (Tp−Ts) is the same as ($\Delta$Tp−$\Delta$Ts). When a correlation graph representing the correlation between $\Delta$Tp and $\Delta$Ts is moved so that ($\Delta$Tp−$\Delta$Ts) on that graph is matched with the obtained ($\Delta$Tp−$\Delta$Ts), the position of the horizontal axis of the correlation graph represents the ambient temperature Te.

Thus, it is possible to accurately estimate the ambient temperature, which influences characteristics (e.g., gamma characteristics) of the display panel. Since the correlation represents the time-varying temperature rise with respect to the ambient temperature, the ambient temperature can be accurately estimated not only when the display device is placed in a thermally stable state, but also, for example, when the display device is placed in a thermally transition state for a certain time immediately after the display device having no heat generated by the circuit thereof or convective heat is powered on. Further, there is no need to dispose temperature sensors in positions which are not influenced by heat generated by the display device.

The control unit 30 specifies a threshold temperature corresponding to the amount of light set using the operation switch 4 and correlation information between the first and second temperature differences corresponding to the threshold temperature. For example, the control unit 30 may specify correlation information by obtaining a threshold temperature $\Delta$Tth corresponding to the set amount of light and then calculating the correlation between the first temperature difference $\Delta$Tp and second temperature difference $\Delta$Ts corresponding to the threshold temperature $\Delta$Tth. Alternatively, the control unit 30 may specify correlation information by previously storing, in the memory 17, multiple different threshold temperatures $\Delta$Tth corresponding to the amounts of light of the backlight 3 and multiple different pieces of correlation information between the first temperature difference $\Delta$Tp and the second temperature difference $\Delta$Ts corresponding to the different threshold temperatures and then referring to the pieces of correlation information.

Figure 8:
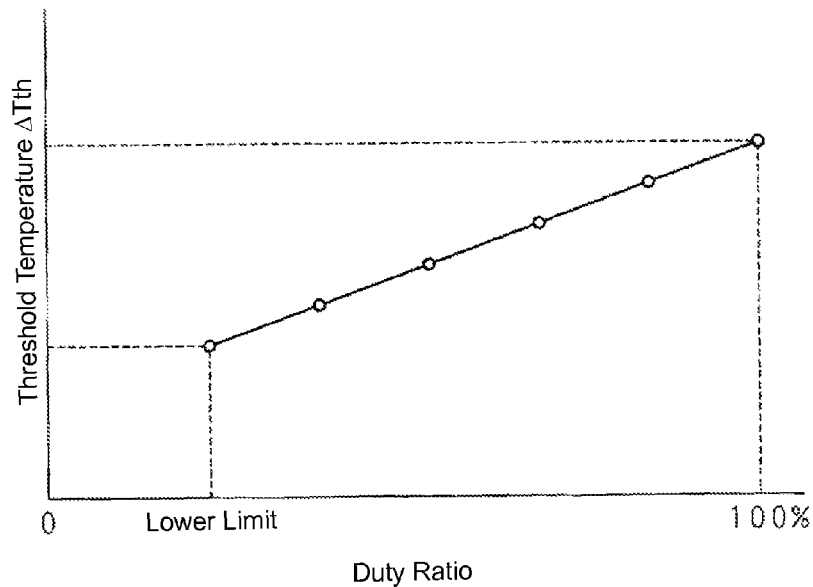
FIG. 8 is a graph showing an example of the relationship between the duty ratio of a drive signal outputted to a backlight and a threshold temperature ΔTth.

FIG. 8 is a graph showing an example of the relationship between the duty ratio of a drive signal outputted to the backlight 3 and the threshold temperature $\Delta$Tth. The threshold temperature $\Delta$Tth is the temperature at which the second stage starts, and depends on the amount of heat generated by the backlight 3. The amount of heat generated by the backlight 3 corresponds to the amount of drive of the backlight 3, that is, the duty ratio (PWM value) of a drive signal outputted to the backlight 3. For this reason, multiple different threshold temperatures $\Delta$Tth corresponding to the amounts of light of the backlight 3 are predetermined, and different pieces of correlation information between the first temperature difference $\Delta$Tp and the second temperature difference $\Delta$Ts corresponding to the threshold temperatures $\Delta$Tth are predetermined.

As shown by circles in FIG. 8, threshold temperatures $\Delta$Tth corresponding to some representative values (e.g., three to five values) of the duty ratio may be predetermined, and the values between the representative values may be obtained by linear interpolation.

The control unit 30 estimates the ambient temperature using the correlation information corresponding to the set amount of light. Specifically, the control unit 30 determines a threshold temperature $\Delta$Tth corresponding to the set amount of light, determines correlation information corresponding to the determined threshold temperature $\Delta$Tth, and estimates the ambient temperature using the determined correlation information. Thus, even when the amount of light of the backlight 3 is changed, the ambient temperature can be accurately estimated.

In the above example, the values of A, B, and C serving as coefficients in the formulas representing the correlation between the first temperature difference $\Delta$Tp and the second temperature difference $\Delta$Ts can be changed according to the shape or size of the display device 100, the positional relationship between the display panel and the backlight, the mounting positions of the temperature sensors 10 and 20, or the like. For this reason, it is only necessary to previously obtain A, B, and C as parameters.

The ambient temperature around the display device of the present embodiment may be estimated as follows. That is, the ambient temperature is estimated by previously storing, in a computer-readable recording medium, a computer program representing a process including steps, such as specifying correlation information indicating the correlation between the first temperature difference between the temperature detected by the panel temperature sensor 10 disposed adjacent to the display panel 2 and the ambient temperature and the second temperature difference between the temperature detected by the switch board temperature sensor 20 disposed in a position different from the panel temperature sensor 10 so that the temperature changes at a different rate until reaching thermal equilibrium and the ambient temperature and estimating the ambient temperature on the basis of the specified correlation information and the temperatures detected by the panel temperature sensor 10 and the switch board temperature sensor 20, and then causing a personal computer including a recording-medium reader, a CPU, and a RAM to load the computer program stored in the recording medium into the RAM using the recording-medium reader and to execute the program using the CPU.

The specifying step may include the following more specific steps: specifying a predetermined threshold temperature; when the difference temperature between the first and second temperature differences is smaller than the predetermined threshold temperature, specifying correlation information where the first and second temperature differences increase at different rates with time; and when the difference temperature is greater than the predetermined threshold temperature, specifying correlation information where the first and second temperature differences increase at similar rates with time.

In the above example, the switch board temperature sensor 20 is disposed adjacent to the backlight 3. Alternatively, by disposing it in a position remote from the backlight 3, the switch board temperature sensor 20 may be prevented from being directly influenced by heat (conductive heat or radiant heat) generated by the backlight 3. In this case, there is no need to specify a correlation in such a manner to correspond to the two stages, unlike in FIG. 4.

Figure 9:
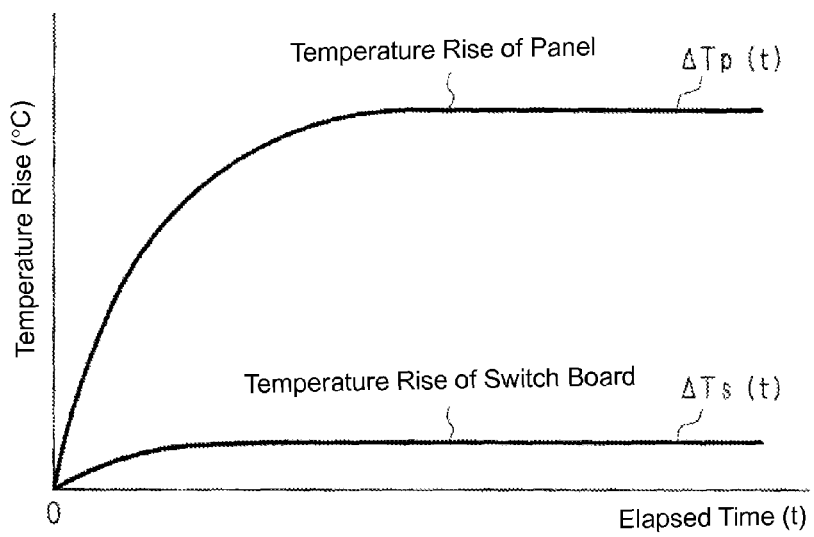
FIG. 9 is a graph showing an example of temperature changes in the display device when a switch board temperature sensor is disposed in a position where the switch board temperature sensor is not directly influenced by heat generated by the backlight.

FIG. 9 is a graph showing an example of temperature changes in the display device 100 when the switch board temperature sensor 20 is disposed in a position where the switch board temperature sensor 20 is not directly influenced by heat generated by the backlight 3. The temperature inside the casing 1 housing the display panel 2 is derived from the ambient temperature Te, heat (e.g., conductive heat or radiant heat) generated by the backlight 3, and the convection inside the casing 1. Immediately after the display device 100 is powered on, the display device 100 is influenced by heat generated by the backlight 3 to only a very small extent, and the convection in the casing 1 associated with such heat is also very small. Accordingly, the temperatures Tp and Ts detected by the panel temperature sensor 10 and the switch board temperature sensor 20 can be regarded as being the same. That is, the first temperature difference $\Delta Tp$ and the second temperature difference $\Delta Ts$ can be regarded as being the same.

Subsequently, heat generated by the backlight 3 raises the temperature Tp detected by the panel temperature sensor 10. On the other hand, the switching board temperature sensor 20 is not directly influenced by heat generated by the backlight 3 since it is disposed in a position remote from the backlight 3. For this reason, the temperature Ts detected by the switching board temperature sensor 20 does not rise abruptly unlike the temperature Tp detected by the panel temperature sensor 10.

Subsequently, heat generated by the backlight 3 causes the influence of the convection in the casing 1. Thus, the temperatures Tp and Ts detected by the panel temperature sensor 10 and the switch board temperature sensor 20 rise with unique time constants $\tau p$ and $\tau s$ ($\tau p$ has a value different from $\tau s$), respectively.

The control unit 30 can estimate the ambient temperature Te on the basis of a correlation represented by a graph as shown in FIG. 9 and the temperatures Tp and Ts detected by the panel temperature sensor 10 and the switch board temperature sensor 20. That is, if the temperatures Tp and Ts can be detected, ($\Delta Tp - \Delta Ts$) can be obtained, and the ambient temperature Te can be estimated using the correlation between the obtained ($\Delta Tp - \Delta Ts$) and the temperature difference $\Delta Ts$ between the temperature Ts and the ambient temperature Te. Thus, it is possible to accurately estimate the ambient temperature, which influences characteristics (gamma characteristics) of the display panel. Since the correlation is the correlation between time-varying temperature rises with respect to the ambient temperature, it is possible to accurately estimate the ambient temperature, not only when the display device is placed in a thermally stable state, but also, for example, when the display device is placed in a thermally transition state after the display device is powered on. Further, there is no need to dispose temperature sensors in positions which are not influenced by heat generated by the display device.

The control unit 30 rewrites the data in the subsequent LUT 15 on the basis of the estimated ambient temperature to correct gradation characteristics of the display panel 2.

Figure 10:
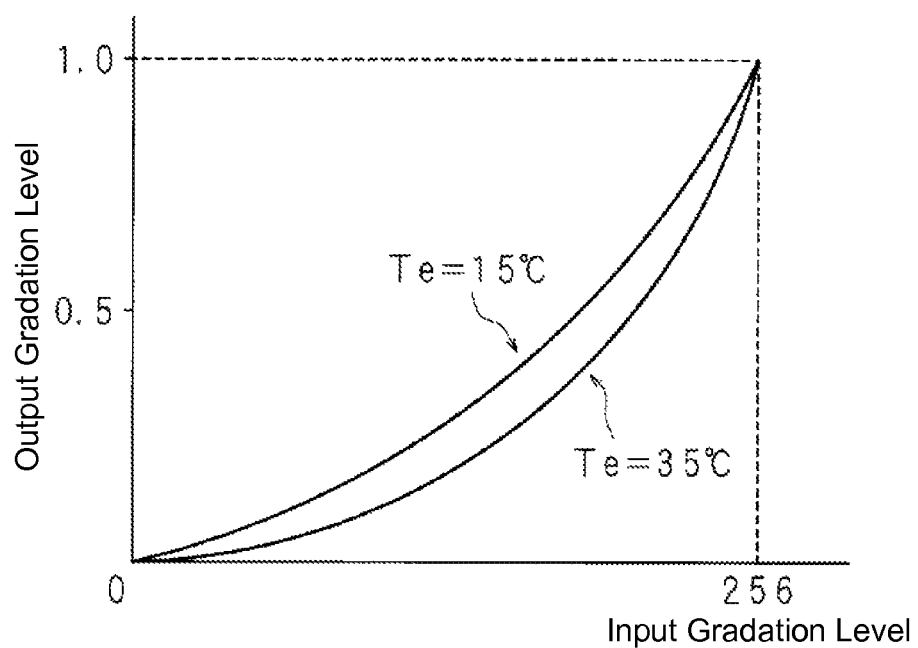
FIG. 10 is a graph showing an example of the temperature-dependence of gamma characteristics of the display panel.

FIG. 10 is a graph showing an example of the temperature-dependence of gamma characteristics of the display panel. In an example of FIG. 10, the output gradation level of the display panel corresponding to the input gradation level decreases as the temperature of the display panel increases. Note that there are also display panels having temperature dependence opposite to that in the example of FIG. 10 (that is, the output gradation level of the display panel corresponding to the input gradation level increases as the temperature of the display panel rises).

The control unit 30 compensates for variations in gradation characteristics resulting from temperature variations by rewriting the value of the output gradation level corresponding to the input gradation level of the subsequent LUT 15 in such a manner to correspond to the temperature. Thus, the control unit 30 obtains ideal gradation characteristics. It is ideal to measure the temperature of the display panel itself and then to correct gradation characteristics in such a manner to correspond to the measured temperature. However, measurement of the display panel itself requires incorporation of a temperature sensor into the panel. For this reason, correction of gradation characteristics is performed using the ambient temperature and the display device-derived temperatures, which can be measured easily. For the ambient temperature, the temperature estimated using the above method is used. For the display device-derived temperature, the temperature obtained by subtracting the ambient temperature from the panel temperature Tp detected by the panel temperature sensor 10 is used. For example, correction of gradation characteristics is performed by previously storing the ambient temperature and the display device-derived temperature at the time point when the output gradation level is written to the subsequent LUT 15 (at the time of factory adjustment), subsequently obtaining the amount of gradation-level compensation corresponding to a variation in temperature between that time point and the current time point, and rewriting the subsequent LUT 15 on the basis of the obtained amount of gradation-level compensation. Thus, the gradation characteristics or color reproducibility at the time point when the output gradation level has been written are maintained. As a result, not only when the display device 100 is placed in a thermally transition state, but also when it is placed in a stable state (thermal equilibrium), it is possible to temperature-compensate display characteristics (gradation characteristics) to reproduce ideal or desired gradation characteristics or hue.

In the above embodiment, when the display device 100 is cold-started, the panel temperature sensor 10 and the switch board temperature sensor 20 may be calibrated. For example, calibration may be performed by simply subtracting the switch substrate temperature Ts from the panel temperature Tp immediately after power-on of the display device 100 so that the panel temperature Tp and the switch substrate temperature Ts become equal.

In the above embodiment, the second temperature sensor is disposed on the switch substrate, which is a position different from the mounting position of the panel temperature sensor 10 serving as the first temperature sensor. However, the second temperature sensor need not necessarily be disposed on the switch substrate and may be disposed in a different position of the casing, as long as the temperatures can change in a different manner before reaching thermal equilibrium.

By incorporating a three-dimensional acceleration sensor or the like into the casing 2, the correlation between the first temperature difference ΔTp and the second temperature difference ΔTs may be changed based on a change in the vertical or horizontal position of the casing of the display device 100, or a change in the slope of the display screen, or the like. Thus, even when the temperature change state of the casing is changed due to a change in the vertical or horizontal position of the casing of the display device 100, a change in the slope of the display screen, or the like, it is possible to specify an appropriate correlation to obtain the ambient temperature accurately.

Two or more temperature sensors may be disposed. In this case, the correlation between at least two or all temperature sensors is previously prepared. The estimation means may obtain the average of obtained multiple ambient temperatures and then determine this average as the ambient temperature, or may determine the most frequent value as the ambient temperature.

DESCRIPTION OF NUMERALS

100 liquid crystal display device
1 casing
2 display panel
3 backlight
4 operation switch
10 panel temperature sensor
20 switch board temperature sensor
11 signal input unit
12 preceding LUT
13 color control unit
14 unevenness correction unit
15 subsequent LUT
16 display panel drive unit
17 memory
18 backlight drive unit
30 control unit

The invention claimed is:

1. A display device having a display panel disposed in a casing, comprising:

two or more temperature sensors disposed in different positions;

a control means configured to temperature-compensate display characteristics on the basis of the temperatures detected by the temperature sensors;

specification means configured to specify correlation information indicating a correlation between temperatures detected by the temperature sensors; and estimation means configured to estimate an ambient temperature around the display device on the basis of the correlation information specified by the specification means and the temperatures detected by the temperature sensors, wherein the temperature sensors are disposed in the positions whose temperatures change in a different manner until reaching thermal equilibrium, wherein the specification means specifies; (i) when a difference temperature between a first temperature difference and a second temperature difference, based on the temperatures detected by the temperature sensors is smaller than a predetermined threshold temperature, a correlation information where the first temperature difference and the second temperature difference increase at different rates with time; or (ii) when the difference temperature between the first temperature difference and the second temperature difference is greater than the predetermined threshold temperature, a correlation information where the first temperature difference and the second difference increase at similar rates with time and further comprising a backlight for the display panel, wherein the estimation means estimates the ambient temperature using the one piece of correlation information specified by the specification means.

2. The display device of claim 1, further comprising setting means configured to set the amount of light of the backlight, wherein the specification means specifies correlation information using the predetermined threshold temperature corresponding to the amount of light set by the setting means.

\* \* \* \* \*